April 3, 1934.    H. B. CHASE    1,953,877
GLARESHIELD FOR MOTOR VEHICLES
Filed Oct. 5, 1932    2 Sheets-Sheet 1
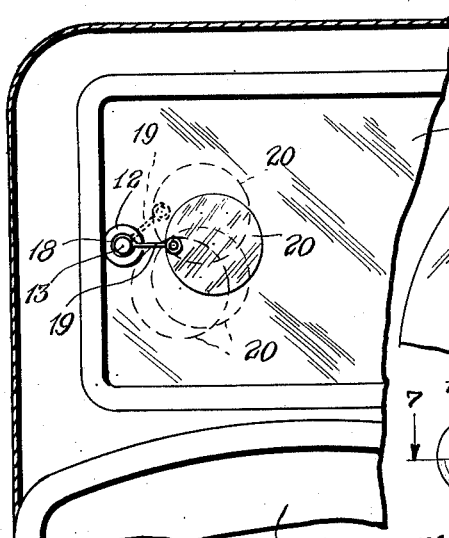
Fig.1.
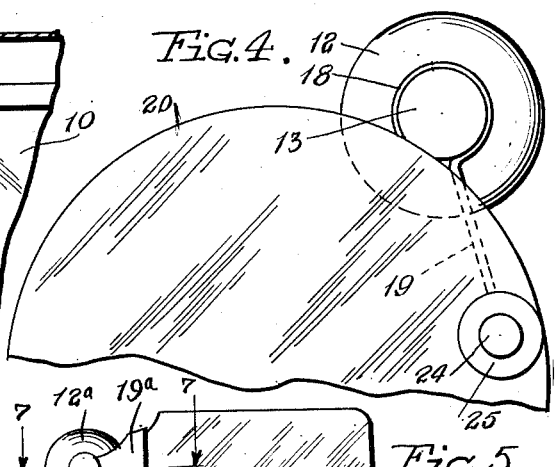
Fig.4.
Fig.5.
Fig.6.
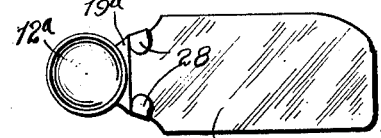
Fig.7.
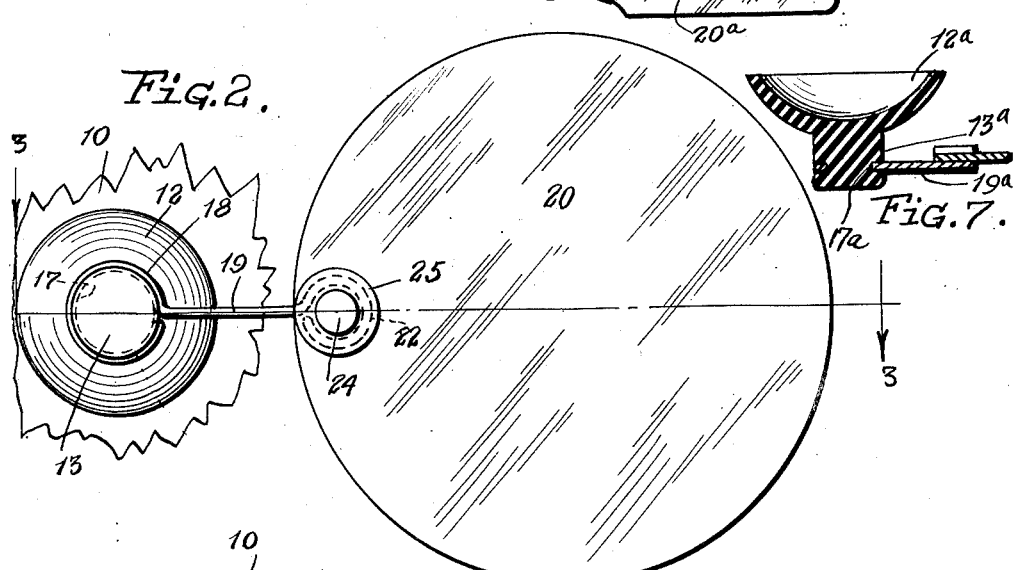
Fig.2.
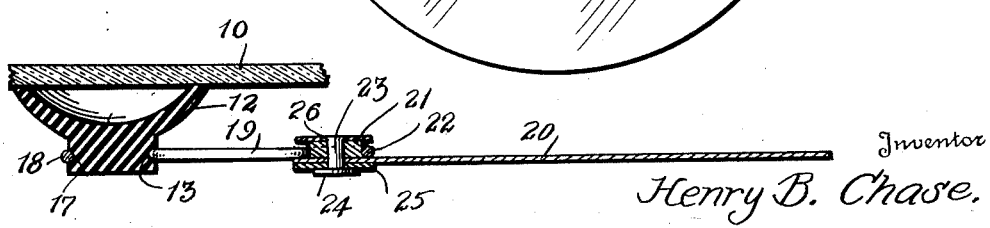
Fig.3.
Inventor
Henry B. Chase.
By
T. A. Bryant
Attorney.

April 3, 1934.  H. B. CHASE  1,953,877
GLARESHIELD FOR MOTOR VEHICLES
Filed Oct. 5, 1932   2 Sheets-Sheet 2
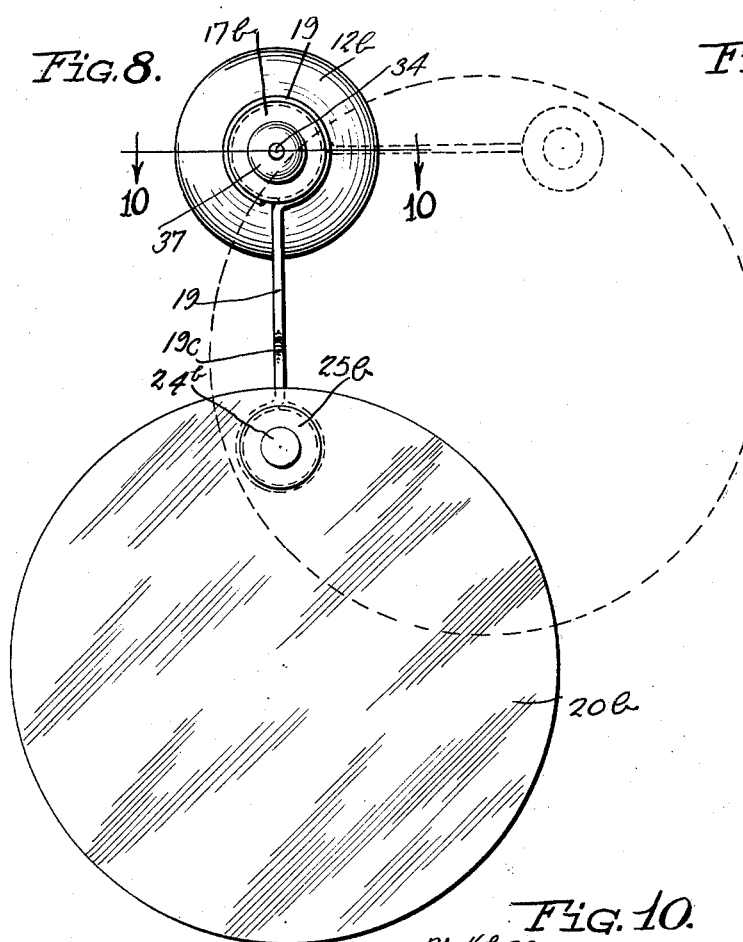
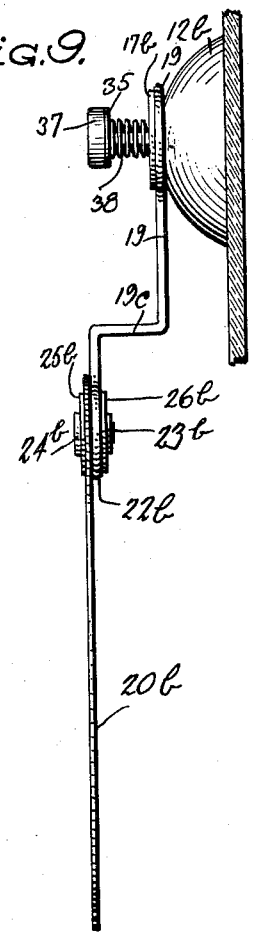
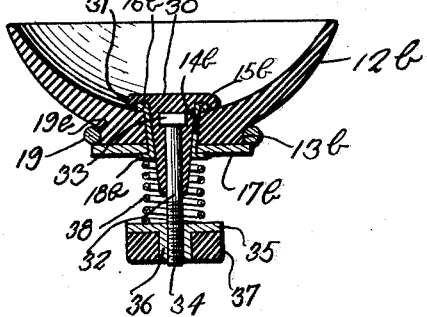
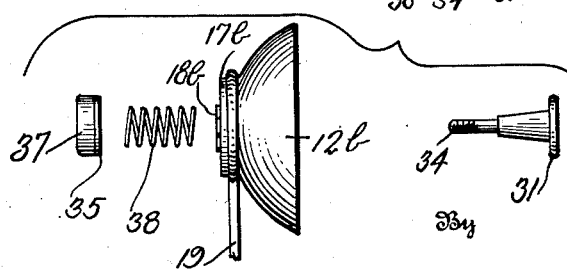
Inventor
Henry B. Chase.

Patented Apr. 3, 1934

1,953,877

UNITED STATES PATENT OFFICE 1,953,877

GLARESHIELD FOR MOTOR VEHICLES

Henry B. Chase, Ithaca, N. Y.

Application October 5, 1932, Serial No. 636,409

1 Claim. (Cl. 296—97)

This invention relates to certain new and useful improvements in glareshields for motor vehicles.

The primary object of the invention is to provide a glareshield for motor vehicles of the type embodying a vacuum or suction cup to be engaged with any part of the motor vehicle, preferably the glass windshield thereof and is constructed in a manner whereby a full range of adjustment is possible to shield the glare of sunlight or the headlights of approaching motor vehicles.

A further object of the invention is to provide a glareshield of the foregoing character comprising a link member connecting the suction cup to the glareshield plate or disk with the latter movably mounted upon one end of the link member while the link member has a frictionally restrained pivotal connection with the suction cup for a wide range of adjustments of the glareshield plate or disk.

A further object of the invention is to provide a novel form of suction cup having a valve therein for releasing the suction cup from its support by breaking the vacuum as the valve is opened.

It is a further object of the invention to provide a glareshed embodying a suction cup with the back block portion of the cup having the loop end of a link member sprung thereon to offer resistance to pressure on the rubber of the neck portion by the loop of the link whereby the link carrying the glareshield plate or disk is frictionally maintained in adjusted positions.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary elevational view, partly in section of the windshield portion of a motor vehicle with the glareshield mounted thereon and illustrated by dotted lines in adjusted position;

Figure 2 is a plan view of the glareshield with a portion of the windshield glass fragmentarily illustrated, showing the link connection between the vacuum or suction cup and the glareshield plate or disk;

Figure 3 is a longitudinal sectional view taken on line 3—3 of Figure 2, showing the link connection between the suction cup and glareshield plate or disk;

Figure 4 is an elevational view showing an adjustment of the device with the glareshield or plate or disk overlying a portion of the suction cup;

Figure 5 is a top plan view of another form of glareshield;

Figure 6 is a bottom plan view of the glareshield shown in Figure 5;

Figure 7 is a detail sectional view taken on line 7—7 of Figure 5;

Figure 8 is a plan view of a windshield screen embodying this invention showing a modified connection between the suction cup and the glareshield supporting link;

Figure 9 is a side elevation of the form as shown in Figure 8;

Figure 10 is a diametrical cross-sectional view of the suction cup shown in Figures 8 and 9, illustrating in enlarged detail the construction of the friction joint between the glareshield link and suction cup; and Figure 11 is an exploded view of the friction connection between the suction cup and glareshield link.

Referring more in detail to the accompanying drawings and particularly to Figures 1 to 4, there is illustrated a glareshield for motor vehicles, the glareshield being of the type embodying a suction or vacuum cup and a glareshield plate or disk adapted for mounting on the windshield 10 of a motor vehicle 11. The glareshield includes an elastic or rubber cup 12 with a cylindrical stud 13 projecting outwardly of the closed side thereof.

The stud 13 is provided with an external annular groove 17 for the reception of the ring or looped end 18 of a link rod 19.

The glareshield further includes a plate or disk 20 preferably formed of flexible transparent colored material, such as pyroxylin or the like, the glareshield disk 20 being connected to the other end of the link arm 19. The connection between the glareshield disk 20 and the link arm 19 includes a peripherally grooved disk 21 having the adjacent ring or looped end 22 of the link arm 19 received in the groove of said disk, the glareshield disk 20 having an opening therein adjacent its peripheral edge for the passage of a tubular rivet 23 which also passes through the disk 21, the tubular rivet 23 carrying a head 24 at one end that is engageable with a washer 25 contacting the glareshield disk 20 while the opposite end of the tubular rivet 23 is swaged outwardly as at 26 for securing the disk 21, glareshield disk 20 and washer 25 together as a unit for frictionally restrained rotation in the loop 22 of the link arm 19.

In the form of the invention illustrated in Figures 5 to 7, the rubber suction cup 12a has a neck or stud portion 13a provided with an annular external groove 17a. A plate 19a is provided with an opening in one end to be received on the stud 13a within the groove 17a for turning movement thereon. The glareshield plate 20a formed of transparent colored material is secured to the other end of the plate 19a by return bent end lugs 28 carried by the plate 19a, the plate 19a having a pivot bearing on the stud 13a.

Attention is now directed to Figures 8 to 11 inclusive wherein is shown a still further form of the invention in which the suction cup 12b is provided with a stud 13b, having a central opening 14b through which is passed a conical sleeve 15b provided with a head 16b. The reduced end of the sleeve 15b is passed through a washer 17b and is swaged as at 18b to hold the washer in place. Formed externally of the stud 13b is an annular groove 19b for receiving the looped end 18 of the swinging link 19 which is constructed exactly in accordance with Figures 1 to 4 inclusive with the exception that the link 19 shown in Figures 8 to 11 is provided with an offset portion 19c for spacing the glare screen 20b a greater distance from the windshield.

The connection between the offset portion 19c of the link 19 with the glare screen 20b is identical with the connection shown in Figures 1 to 4 inclusive and comprises a rubber disk 21b passed through the looped end 22b of the link 19 through which is passed a rivet 23b having a head 24b extending through a washer 25b and into an opening formed in the glare screen 20b. The opposite end of the rivet is passed through a washer 26b and is swaged to frictionally hold the glare screen in an adjusted position relative to the link 19.

Movably mounted within the conical sleeve 15b is a correspondingly shaped rubber valve plug 30 having formed at its enlarged end an annular flange 31 which completely overlies the flanged head 16b of the conical sleeve 15b and forms an airtight seal therebetween.

Embedded in the rubber valve plug 30 is a bolt 32 having a head 33 to assist in anchoring the bolt in place. The free end of the bolt is screw threaded as at 34 for receiving a metallic screw threaded disk 35 having a boss 36 around which is cemented a rubber finger piece 37. A coiled spring 38 has one of its ends abutting the swaged end 18b of the conical sleeve 15b while the opposite end abuts the screw threaded disk 35 to normally hold the valve plug 30 seated in the conical sleeve 15b.

After the suction cup 12b has been positioned on the windshield and it is desired to remove the same to locate the glare screen in different positions it is only necessary to press the finger piece 37 which unseats the valve plug 30 against the action of the coil spring 38 thereby breaking the vacuum within the suction cup which releases the glare screen from the windshield.

The glareshield shown in Figures 1 to 4 is illustrated as mounted upon the windshield 10 of the motor vehicle by means of the suction cup 12. Distortion of the cup to effect retention thereof upon the windshield 10 moves a part of the material embodied therein into the space between the stud 13 and the link arm loop 18, which aids in frictionally retaining the link arm 19 in adjusted position, such as illustrated by full and dotted lines in Figure 1. The frictional engagement between the loop end 22 of the link arm 19 and the glareshield disk 20 also operates to retain the glareshield disk 20 in its adjusted position. With a device of this character, a wider range of adjustment of the glareshield disk is possible in view of the adjustable or pivotal mounting of each end of the link arm 19, one end on the suction cup 12 and the other end on the glareshield disk 20. In the form of invention illustrated in Figures 5 to 7, a single adjustment for the glareshield plate 20a is provided and the plate 19a is pivotally supported on the stud 13a is effectively maintained in adjusted position resulting from the movement of a part of the material embodied in the suction cup 12a into the space between the external stud groove and adjacent end of the plate 19a.

It is to be understood that the suction cup as shown in Figures 8 to 11 inclusive may be employed for supporting such articles as coat hangers, electric light sockets, towel racks, mirrors, ash trays and all other articles for window decoration.

From the above detailed description of the invention, it is believed that the construction and operation thereof will at once be apparent and while there are herein shown and described, the preferred embodiments of the invention, it is nevertheless to be understood that minor changes may be made therein without departing from the spirit and scope of the invention as claimed.

I claim:

In a glare shield of the character described, a suction cup, a glare shield, a link connecting the suction cup and glare shield, said suction cup having an axial opening therein, a sleeve fitted in the opening and flanged at its inner end for engagement with the cup, a washer at the outer arched side of the cup and through which the sleeve extends, the outer end of the sleeve being flanged for engagement with the washer to retain the same in position, the end of the opening at the concaved side of the cup constituting a valve seat, a valve body mounted in the opening and having a flanged bead for engagement with the seat, a pin carried by the valve body and projecting outwardly of the sleeve, a finger piece carried by the outer end of the pin and a coil spring surrounding the valve body and pin between the washer and finger piece for normally urging the valve bead towards its seat.

HENRY B. CHASE.